US011900706B1

United States Patent
Qian et al.

(10) Patent No.: US 11,900,706 B1
(45) Date of Patent: Feb. 13, 2024

(54) OBJECT OF INTEREST DETECTOR DISTANCE-BASED MULTI-THRESHOLDING

(71) Applicant: ObjectVideo Labs, LLC, Tysons, VA (US)

(72) Inventors: Gang Qian, McLean, VA (US); Allison Beach, Leesburg, VA (US); Sima Taheri, McLean, VA (US); Sravanthi Bondugula, Vienna, VA (US); Sung Chun Lee, Tysons, VA (US); Narayanan Ramanathan, Chantilly, VA (US)

(73) Assignee: ObjectVideo Labs, LLC, Tysons, VA (US)

( * ) Notice: Subject to any disclaimer, the term of this patent is extended or adjusted under 35 U.S.C. 154(b) by 182 days.

(21) Appl. No.: 17/030,965

(22) Filed: Sep. 24, 2020

Related U.S. Application Data (60) Provisional application No. 62/924,286, filed on Oct. 22, 2019.

(51) Int. Cl.
*G06T 7/20* (2017.01)
*G06N 20/00* (2019.01)
(Continued)

(52) U.S. Cl.
CPC .......... *G06V 40/10* (2022.01); *G06F 18/2113* (2023.01); *G06N 20/00* (2019.01);
(Continued)

(58) Field of Classification Search
CPC ...... G06V 40/10; G06V 10/25; G06V 30/147; G06V 10/44; G06V 10/771; G06V 30/1912; G06V 10/10; G06V 10/20; G06V 30/194; G06V 10/82; G06V 10/454; G06V 10/255; G06V 30/1473; G06V 20/52; G06V 40/103; G06V 20/58; G08B 13/18; G08B 13/194; G08B 13/196; G08B 13/19602; G08B 13/19606; G08B 13/19613; G06K 9/00; G06K 9/623; G06K 9/62; G06K 9/6217;
(Continued)

(56) References Cited

U.S. PATENT DOCUMENTS

7,965,866 B2 6/2011 Wang et al.
9,208,675 B2 12/2015 Xu et al.
(Continued)

*Primary Examiner* — Sumati Lefkowitz
*Assistant Examiner* — Michael Adam Shariff
(74) *Attorney, Agent, or Firm* — Fish & Richardson P.C.

(57) ABSTRACT

Methods, systems, and apparatus, including computer programs encoded on computer storage media, for tracking objects of interest using distance-based thresholding. One of the methods includes detecting an object depicted in an image captured by a camera, determining a predicted physical distance between the object and the camera, selecting, from a plurality of predetermined confidence thresholds, a confidence threshold for the predicted physical distance, each confidence threshold in the plurality of predetermined confidence thresholds for a different physical distance range, the confidence threshold having a physical distance range that includes the predicted physical distance, and determining, using the confidence threshold and a confidence score that indicates a likelihood that the object is an object of interest, that the object is likely an object of interest.

20 Claims, 5 Drawing Sheets

(51) Int. Cl.
  *G06T 7/70* (2017.01)
  *G06V 40/10* (2022.01)
  *G06F 18/2113* (2023.01)

(52) U.S. Cl.
  CPC .................. *G06T 7/20* (2013.01); *G06T 7/70* (2017.01); *G06T 2207/20081* (2013.01)

(58) Field of Classification Search
  CPC ............. G06K 9/6256; G06T 2210/12; G06T 2207/30196; G06T 2207/10016; G06T 7/70; G06T 2207/20081; G06T 2207/20084; H04N 5/225; H04N 5/232; G06N 20/00
  See application file for complete search history.

(56) References Cited

U.S. PATENT DOCUMENTS

| | | | |
|---|---|---|---|
| 10,306,135 B2 | 5/2019 | Velipasalar et al. | |
| 11,216,983 B2 * | 1/2022 | Ding | G06V 40/172 |
| 2018/0012462 A1 * | 1/2018 | Heitz, III | G06V 40/20 |
| 2018/0342070 A1 * | 11/2018 | Chen | G06V 20/52 |
| 2019/0130580 A1 * | 5/2019 | Chen | G06V 10/82 |
| 2020/0326179 A1 * | 10/2020 | Tong | G01B 11/026 |
| 2021/0012110 A1 * | 1/2021 | Chen | G06T 7/70 |

* cited by examiner

OBJECT OF INTEREST DETECTOR DISTANCE-BASED MULTI-THRESHOLDING

CROSS-REFERENCE TO RELATED APPLICATION

This application claims the benefit of U.S. Provisional Application No. 62/924,286, filed on Oct. 22, 2019, the contents of which are incorporated by reference herein.

TECHNICAL FIELD

This disclosure relates generally to surveillance cameras (e.g., doorbell cameras).

BACKGROUND

Doorbell cameras are becoming more and more popular. Some properties are equipped with monitoring systems that include doorbell cameras, other sensors, and connected system components.

SUMMARY

Techniques are described for motion-based human video detection.

Some residents and homeowners equip their properties with monitoring systems to enhance the security, safety, or convenience of their properties. A property monitoring system can include cameras that can obtain visual images of scenes at the property. A camera can be incorporated into a component of the property monitoring system, such as a doorbell.

A doorbell camera can detect objects and track object movement within a field of view. For example, a doorbell camera with a field of view that includes a front yard of a property can track movement of objects, e.g., humans, in the front yard. In some examples, movement detected by doorbell cameras can trigger a property monitoring system to perform one or more actions. For example, movements of humans that meet pre-programmed criteria may trigger the property monitoring system to send a notification to a resident of the property or to adjust a setting of the property monitoring system.

While simple motion detection might seem to be effective in this application, the presence of other sources of motion (e.g., cars, animals, flags, shrubs, tree branches and other objects) makes it difficult to send notifications at appropriate times and avoid sending those notifications, for example, when a non-human object is detected. Video analytics that use deep learning algorithms provides a viable solution to this problem. A deep human detector can be trained using a doorbell dataset to detect the presence of a human accurately and with high confidence.

Doorbell cameras can provide notifications to residents when humans, e.g., visitors, approach a property. It is desirable that a doorbell camera accurately detect humans and send valid notifications to the residents. While a detection system can detect humans of different scales, a confidence of detection varies by the distance of the human to the camera. When the human is close to the camera, the human occupies a large portion of the image, and as a result detection confidence is very high. However, as the human is detected further away from the camera, detection confidence drops.

Accordingly, a system may use different human detection confidence requirements at different distances. Use of different human detection confidence requirements may result in fewer objects close to the camera being incorrectly detected as humans, and fewer objects further from the camera being incorrectly not detected as a human.

The subject matter described in this specification can be implemented in various embodiments and may result in one or more of the following advantages. Adaptive thresholding may be beneficial for the tracking algorithm that works based on detection results. It may reduce the possibility of tracking a false positive object and helps a tracker to stay with the object even when the object goes further away from the camera. For example, adaptive thresholding may enable a system to avoid using processing to track objects that are actually not humans and help a system more accurately keep track of a human even when the humans gets further and the system is less confident that the human is a human.

The details of one or more implementations of the subject matter described in this specification are set forth in the accompanying drawings and the description below. Other features, aspects, and advantages of the subject matter will become apparent from the description and the drawings.

BRIEF DESCRIPTION OF THE DRAWINGS

Like reference numbers and designations in the various drawings indicate like elements.

DETAILED DESCRIPTION

Property monitoring systems have recently become very popular. These systems enhance the security, safety, or convenience of their properties. A property monitoring system can include cameras that can obtain visual images of scenes at the property. A camera can be incorporated into a component of the property monitoring system, such as a doorbell. The property can be a home, another residence, a place of business, a public space, or another facility that has one or more doorbell cameras or other security camera, installed.

The human detection system can detect humans at various ranges. As discussed above, when a human is close to the camera, the human occupies a large portion of the image, thus when detection is performed, confidence of detection can be very high. However, as the human moves further away from the camera, detection confidence drops.

Figure 1:
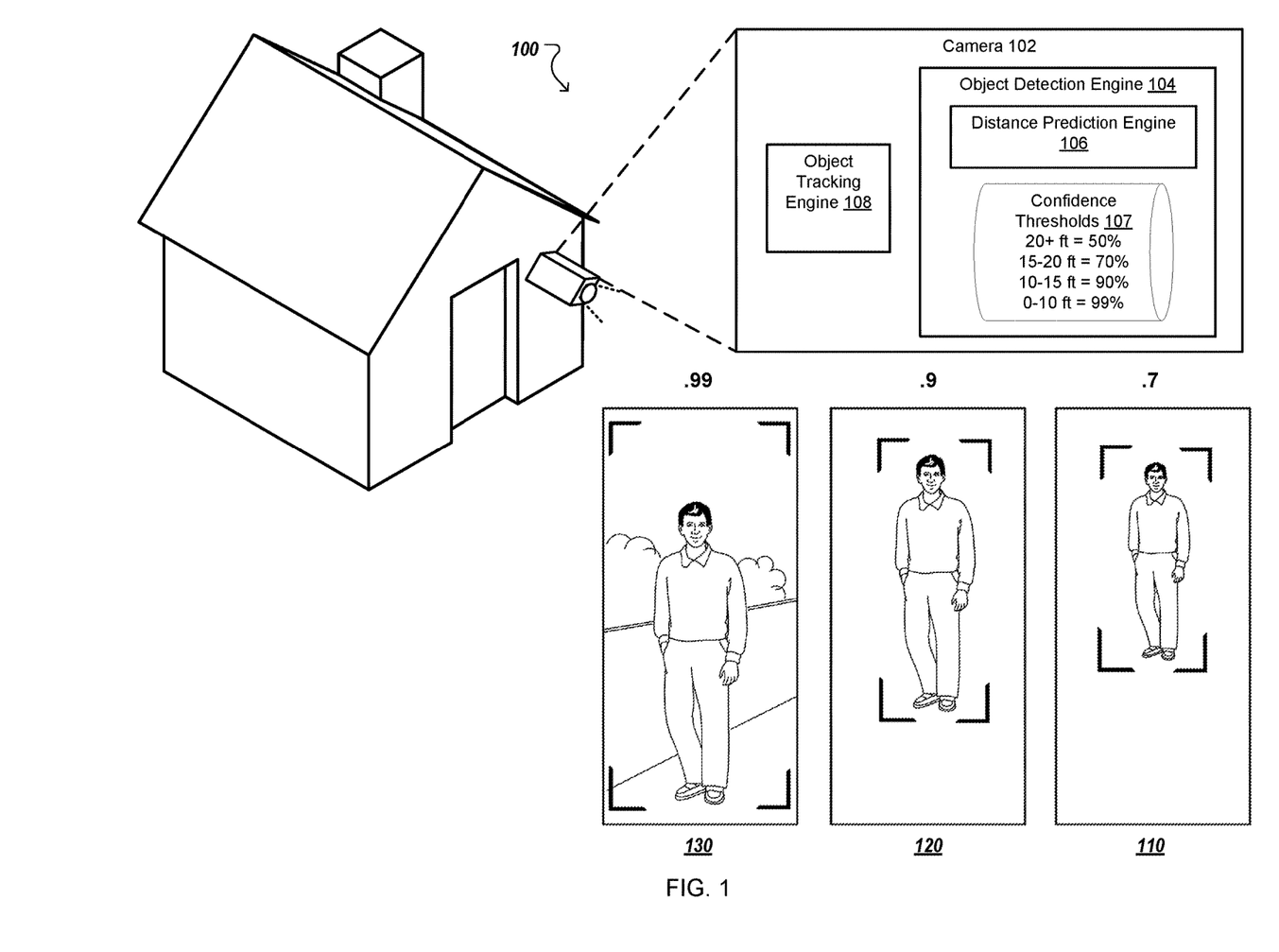
FIG. 1 illustrates examples of confidence levels of human detection at various distances.

FIG. 1 illustrates an example system 100 for confidence levels of human detection at various distances. Image 110 illustrates a point seven (on a scale of zero to one) detection confidence when a human is at first distance (furthest away as compared to images 120 and 130) from the camera. Image 120 illustrates a point nine detection confidence when the human is at a second distance from the camera, and image 130 illustrates a point ninety nine detection confidence value when the human is at a third distance (closest distance) away from the camera.

As discussed above, users would like to be notified of an event as early as possible, thus the system should detect a human approaching the door as soon as possible. That is, the human detector should have a high recall value for humans that are further away from the camera.

Recall value may refer to a measure of sensitivity. For example, detecting all humans with many false positives may correspond to a 100% recall value, detecting half of the humans with no false positives may result in a 50% recall value, and detecting half of the humans with many false positives may also result in a 50% recall value. However, at certain distances (e.g., twenty feet), it may not be desirable to perform detection because the system may detect too many humans that are not moving toward a door. High recall value enables the system to not miss any valid events. When the human is detected, the human tracking module of the doorbell notification system starts tracking the human as the human approaches the doorbell. When the human has moved closer to the camera, while maintaining a high recall value, high precision is desired to prevent a non-valid target from being tracked and so a false notification being generated.

Precision may refer to a measure of positive predictive value. For example, detecting all humans with 50% false positives may correspond to a 50% precision value, detecting half of the humans with no false positives may result in a 100% precision value, and detecting half of the humans with half false positives may also result in a 50% precision value. Such a dynamic recall/precision requirement can be achieved via multi-thresholding.

A distance of objects to the camera can be determined based on height of the objects' corresponding bounding boxes. In some implementations, an area of interest (AOI) is selected (e.g., twenty feet in front of the doorbell camera) for detection. The area of interest is divided into distance groups (e.g., four groups). Although, four distance groups have been chosen as an example, different distance group numbers can be created based on the distance covered.

The system 100 may include a camera 102 that includes an object detection engine 104 that detects objects and an object tracking engine 108 that tracks objects detected by the object detection engine 104. For example, the camera 102 may capture the image 110 and detect a human in the image 110, use the object tracking engine 108 to track the human in the next four frames, and then repeat by detecting for a human in the next image captured by the camera 102. The camera 102 may use the object detection engine 104 every fifth frame as the object detection engine 104 may require more processing than the object tracking engine 108, and the camera 102 may have limited processing power due to power constraints and/or computational constraints.

The object detection engine 104 may include a distance prediction engine 106 and a storage medium 107 that stores confidence thresholds for different distance groups. For example, the distance prediction engine 106 may determine that the object might be a human about eighteen feet away, and the storage medium may store data that specifies a distance group for objects fifteen to twenty feet away has a confidence threshold of 70%. In the example, the storage medium 107 may further specify that a distance group of zero to ten feet has a confidence threshold of 99%, a distance group of ten to fifteen feet has a confidence threshold of 90%, and a distance group of more than twenty feet has a confidence threshold of 50%.

The four distance groups and corresponding confidence thresholds are only shown as an example of FIG. 1. The system 100 may use distance groups with different ranges of distance, different confidence thresholds, and more or less distance groups. For example, the system 100 may use twenty distance groups each covering one foot distances from the camera 102, with the last covering nineteen feet or farther from the camera 102.

The object detection engine 104 may then determine whether a confidence score of the image that shows a human satisfies a confidence threshold of the distance group. For example, the object detection engine 104 may determine that a confidence score of 70% of the image 110 that shows a human eighteen feet away satisfies the confidence threshold of 70% and, in response, provide an indication that a human was detected in the image 110 and begin tracking the human in the new few images using the object tracking engine 108. In another example, the object detection engine 104 may determine that a confidence score of 60% of the image 110 that shows a human seventeen feet away does not satisfy the confidence threshold of 70% and, in response, provide an indication that a human was not detected in the image 110, not detect for objects using the object detection engine 104 or use the object tracking engine 108 for the next four frames, and then for a subsequent fifth frame use the object detection engine 104 again to detect for a human.

Figure 2:
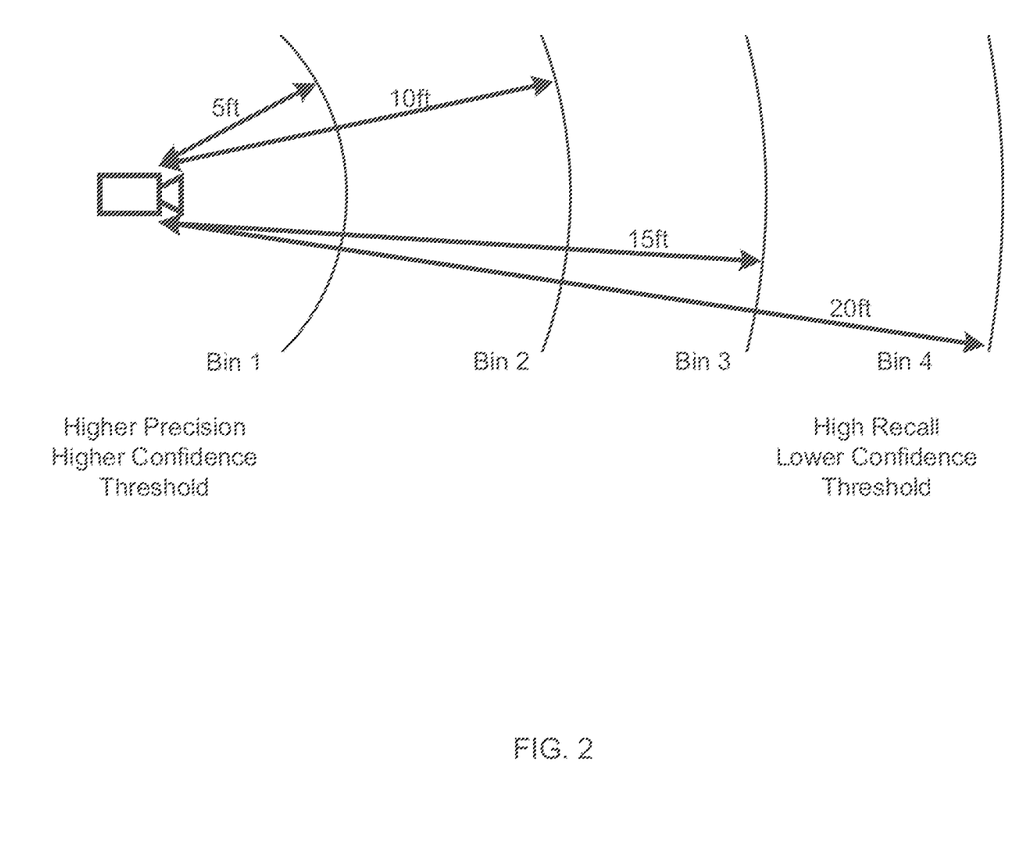
FIG. 2 illustrates an example of distance groups and corresponding distances.

FIG. 2 illustrates an example of distance groups and corresponding distances. For example, group one, sometimes referred to as Bin 1 can include objects that are less than five feet away from the camera, group two, sometimes referred to as Bin 2, can include objects at a distance between five feet and ten feet. In addition, group three, sometimes referred to as Bin 3, can include objects between ten feet and fifteen feet, and group four, sometimes referred to as Bin 4, can include objects that are more than fifteen feet away from the camera.

In a single-thresholding system, a fixed threshold is applied to all the detections. However, it is desirable to have a high recall value at Bin 4 (FIG. 2) (e.g., because the user of the system may want to detect as many humans as possible approaching the door), thus a low detection threshold is selected. However, selecting a low detection threshold results in a low precision at the closer bins (e.g., Bin 1 or Bin 2) which is not desired. Furthermore, the presence of high confidence false alarms in, for example Bin 1 (FIG. 2), requires a high detection threshold. However, a high detection threshold results in a low recall in, for example Bin 4, because true detections have low confidence at that distance.

A multi-thresholding system allows for flexibility of setting a target detection precision/recall value for each group or bin. In the disclosed system, a low confidence threshold can be selected for objects detected furthest from the camera (e.g., Bin 4 of FIG. 2) to achieve high recall value at that distance, and higher confidence threshold can be set for groups corresponding to close distances (e.g., Bin 1 and Bin 2 of FIG. 2) to prevent unwanted false alarms.

Figure 3A:
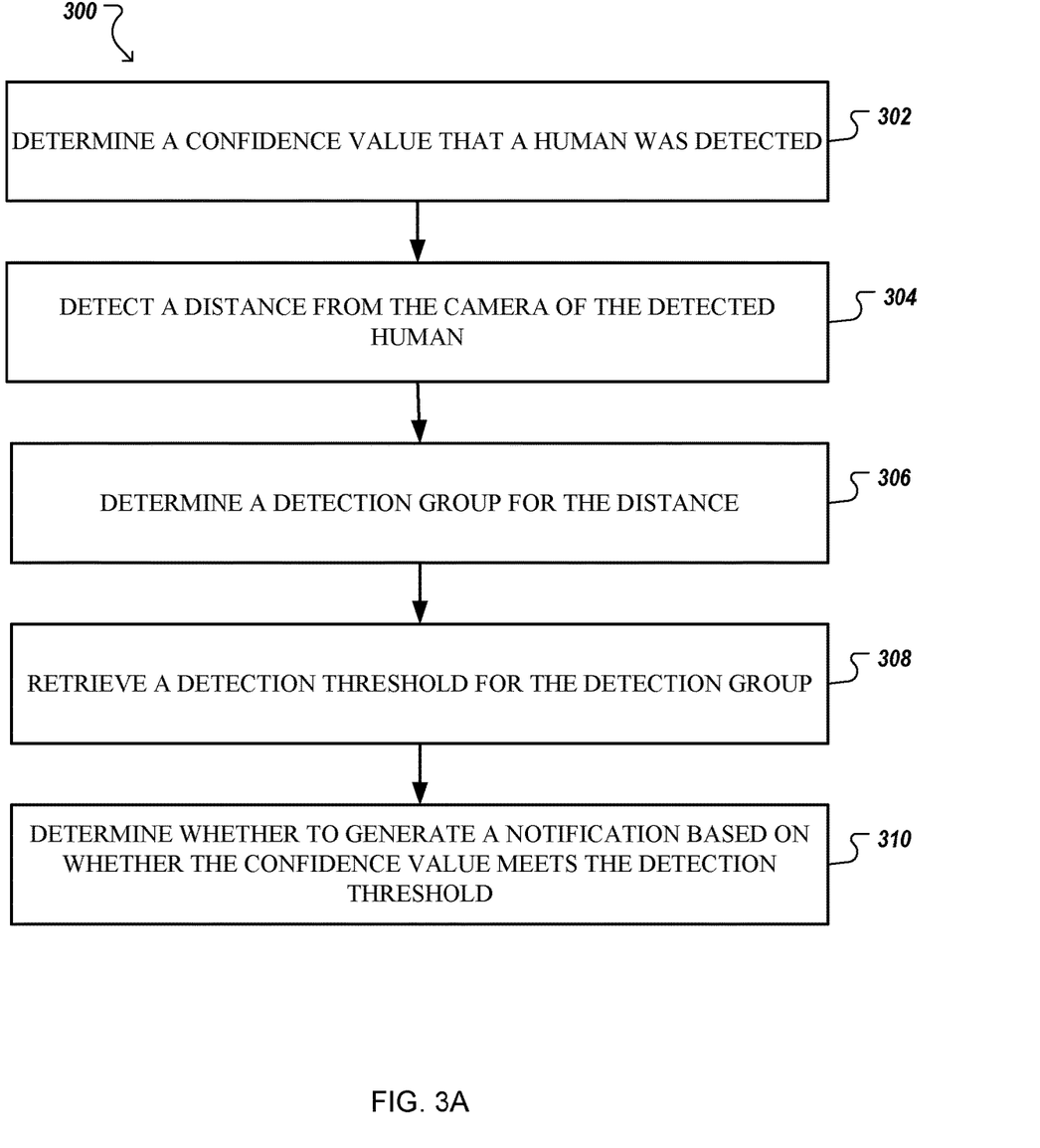
FIG. 3A is a flow chart illustrating an example of actions that a home monitoring system can perform.

FIG. 3A is a flow chart illustrating an example of a process 300 that a home monitoring system can perform. For example, the process 300 may be implemented by the system 100.

At 302, the monitoring system determines a confidence value that a human has been detected. For example, the monitoring system can detect a human using one of the methods described above and determine a confidence value of that detection (e.g., as illustrated in FIG. 1). In an example, the object detection engine 104 may determine a 90% chance that the image 120 shows a human.

At 304, the monitoring system detects a distance of the detected human from the camera. For example, the monitoring system can use software within the camera to detect the distance. In an example, the distance prediction engine

106 may determine the object that is 92% chance a human would be a human twelve feet away from the camera 102.

At 306, the monitoring system determines a detection group for the distance. For example, the monitoring system can store group or bin numbers (e.g., Bin 1 through Bin 4) and corresponding distances. The monitoring system can compare the detected distance with the stored distances to identify the correct group or bin number. For example, the object detection engine 104 may determine that a distance of twelve feet falls within a distance group for ten to fifteen feet away from the camera 102.

At 308, the monitoring system retrieves a detection threshold for the detection group. For example, the detection threshold can be stored together with the detection groups and corresponding distances. The monitoring system can retrieve the appropriate value. For example, the object detection engine 104 may retrieve a confidence threshold of 90%.

At 310, the monitoring system determines whether to generate a notification based on whether the confidence value meets the detection threshold. For example, the monitoring system can compare the confidence value (e.g., 0.99) with a threshold value (e.g., 0.7) and determine that the confidence value is higher than the threshold value. In response, the monitoring system can generate a notification to transmit to the user indicating that a human has been detected. For example, the object detection engine 104 may determine a confidence score of 92% satisfies a confidence threshold of 90%

Figure 3B:
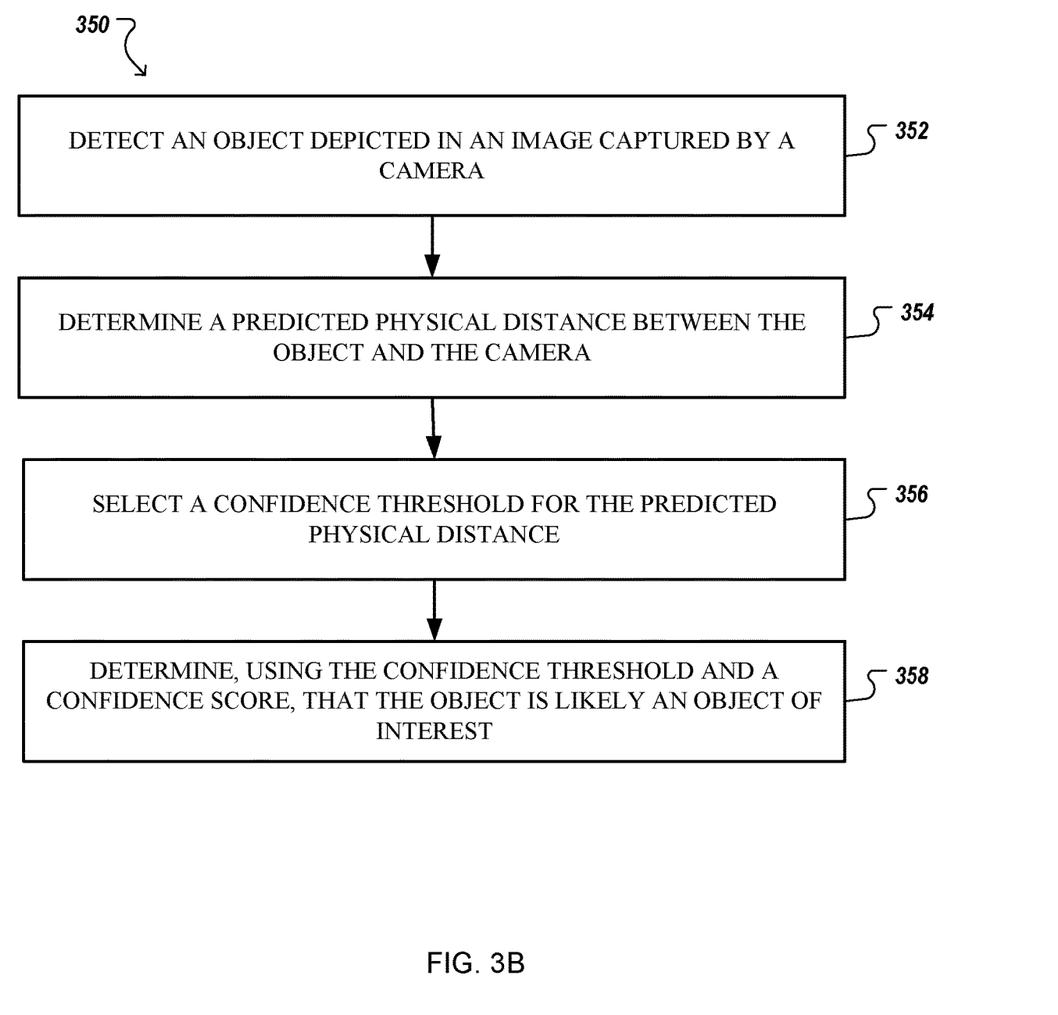
FIG. 3B is a flow chart illustrating an example of actions that a home monitoring system can perform.

FIG. 3B is a flow chart illustrating an example of another process 350 that a home monitoring system can perform. For example, the process 350 may be performed by the camera 102. Briefly, and as will be described in more detail below, the process 350 includes detecting an object depicted in an image captured by a camera (352), determining a predicted physical distance between the object and the camera (354), selecting a confidence threshold for the predicted physical distance (356), and determining, using the confidence threshold and a confidence score that indicates a likelihood that the object is an object of interest, that the object is likely an object of interest (358).

The process 350 includes detecting an object depicted in an image captured by a camera (352). For example, the object detection engine 104 may detect the human in image 130.

The process 350 includes determining a predicted physical distance between the object and the camera (354). For example, the distance prediction engine 106 may determine a predicted physical distance of nineteen feet between the object and the camera 102.

In some implementations, determining the predicted physical distance between the object and the camera includes determining, using a height of a bounding box that surrounds the depiction of the object in the image, the predicted physical distance between the object and the camera. For example, the distance prediction engine 106 may determine that the bounding box is five hundred pixels high and, in response, determine that if the object were a human the human would likely be nineteen feet from the camera 102.

In some implementations, determining, using the height of the bounding box that surrounds the depiction of the object in the image, the predicted physical distance between the object and the camera includes determining, for each of two or more images captured by the camera, a height of a bounding box that surrounds the depiction of the object in the image and determining, using the two or more heights of the bounding boxes that surround the depiction of the object in the two or more images, the predicted physical distance between the object and the camera. For example, the distance prediction engine 106 may determine that the bounding box is five hundred pixels high in a first image and seven hundred pixels high in a second image, determine that five hundred is the smaller of five hundred and seven hundred, and, in response, determine based on the height of five hundred that if the object were a human the human would likely be nineteen feet from the camera 102. In another example, the distance prediction engine 106 may determine that the bounding box is five hundred pixels high in a first image and three hundred pixels high in a second image, determine that three hundred is the smaller of five hundred and three hundred, and, in response, determine based on the height of three hundred that if the object were a human the human would likely be more than twenty feet from the camera 102.

In some implementations, determining, using the height of the bounding box that surrounds the depiction of the object in the image, the predicted physical distance between the object and the camera includes determining the predicted physical distance between the object and the camera using the height of the bounding box that surrounds the depiction of the object in the image and camera calibration data that indicates, for each bounding box height range in a plurality of height ranges, a corresponding predicted physical distance. For example, the distance prediction engine 106 may determine that the bounding box is five hundred pixels high and the camera 102 is three feet above the ground such that an average adult human about nineteen feet away would appear to be five hundred pixels high and, in response, determine that if the object were a human the human would likely be nineteen feet from the camera 102. In another example, the distance prediction engine 106 may determine that the bounding box is three hundred pixels high and the camera 102 is twenty feet above the ground such that an average adult human about nineteen feet away would appear to be three hundred pixels high and, in response, determine that if the object were a human the human would likely be nineteen feet from the camera 102.

In some implementations, determining the predicted physical distance between the object and the camera includes determining, using a predicted location of a bottom of the object in the image, the predicted physical distance between the object and the camera. For example, the distance prediction engine 106 may determine that the bottom of the bounding box is at the bottom of the image so that if the object were a human, the human would be within ten feet of the camera 102. In another example, the distance prediction engine 106 may determine that the bottom of the bounding box is about ⅔ down the image so that if the object were a human, the human would be around twelve feet from the camera 102.

In some implementations, determining, using the predicted location of the bottom of the object in the image, the predicted physical distance between the object and the camera includes determining, for each of two or more images captured by the camera, a predicted location of the bottom of the object in the image and determining, using the two or more predicted locations of the bottom of the object in the two or more images, the predicted physical distance between the object and the camera. For example, the distance prediction engine 106 may determine that the bottom of the bounding box is at the bottom of the first image and about ⅔ down the second image, and as ⅔ down is higher up than the bottom, determine that the human would be around twelve feet of the camera 102.

In some implementations, determining, using the predicted location of the bottom of the object in the image, the predicted physical distance between the object and the camera includes determining, using the predicted location of the bottom of the object in the image and a height of a bounding box that surrounds the depiction of the object in the image, the predicted physical distance between the object and the camera. For example, the distance prediction engine 106 may determine that the bottom of the bounding box is at the bottom of the image and the height of the bounding box is the full height of the image and, in response, determine that the object is within ten feet of the camera 102. In another example, the distance prediction engine 106 may determine that the bottom of the bounding box is ⅔ down the image but the height of the bounding box is the full height of the image and, in response, determine that the object is around twelve feet of the camera 102 as that is the further distance based on separately predicting distance based on the height and the location of the bottom of the object.

The process 350 includes selecting a confidence threshold for the predicted physical distance (356). For example, for the predicted physical distance of nineteen feet the object detection engine 104 may select the confidence threshold of 70%.

The process 350 includes determining, using the confidence threshold and a confidence score that indicates a likelihood that the object is an object of interest, that the object is likely an object of interest (358). For example, for the object detection engine 104 may determine that a confidence score of 75% satisfies the confidence threshold of 70%.

In some implementations, the process 350 includes providing, to a machine learning model trained to detect objects of interest, image data for the object and receiving, from the machine learning model, the confidence score that indicates the likelihood that the object is an object of interest. For example, the object detection engine 104 may be a machine learning model trained to detect objects of interest.

In some implementations, the process 350 includes, in response to determining that the object is likely an object of interest, tracking the object. For example, the object tracking engine 108 may start tracking a human detected by the object detection engine 104.

In some implementations, determining the predicted physical distance between the object and the camera includes determining, for a proper subset of images in a sequence of images, the predicted physical distance between the object and the camera and determining that the object is likely an object of interest includes determining that the object is likely an object of interest and to track the object in each image in the sequence of images. For example, the object detection engine 104 may determine that an object in an image is likely a human and then the object tracking engine 108 may track the object in a next few consecutive images without using the object detection engine 104.

In some implementations, the sequence of images includes five sequential images captured by the camera, determining, for the proper subset of images in the sequence of images, the predicted physical distance between the object and the camera includes determining, for only a first image in the five sequential images, the predicted physical distance between the object and the camera, and determining that the object is likely an object of interest and to track the object in each image in the sequence of images includes determining that the object is likely an object of interest and to track the object in each image in the five sequential images. For example, the object detection engine 104 may detect for humans every five frames and the object tracking engine 108 may be used to track humans in the four frames that follow any detection of a human by the object detection engine 104.

In some implementations, the process includes detecting a second object depicted in a second image captured by the camera, determining a second predicted physical distance between the second object and the camera, selecting, from the plurality of predetermined confidence thresholds, a second confidence threshold for the second predicted physical distance, and determining, using the second confidence threshold, that the second object is not likely an object of interest and to skip tracking of the object. For example, the object detection engine 104 may determine that an object is 80% likely a human that is nine feet away which does not satisfy a confidence threshold of 99% for a distance group of ten feet or less.

Figure 4:
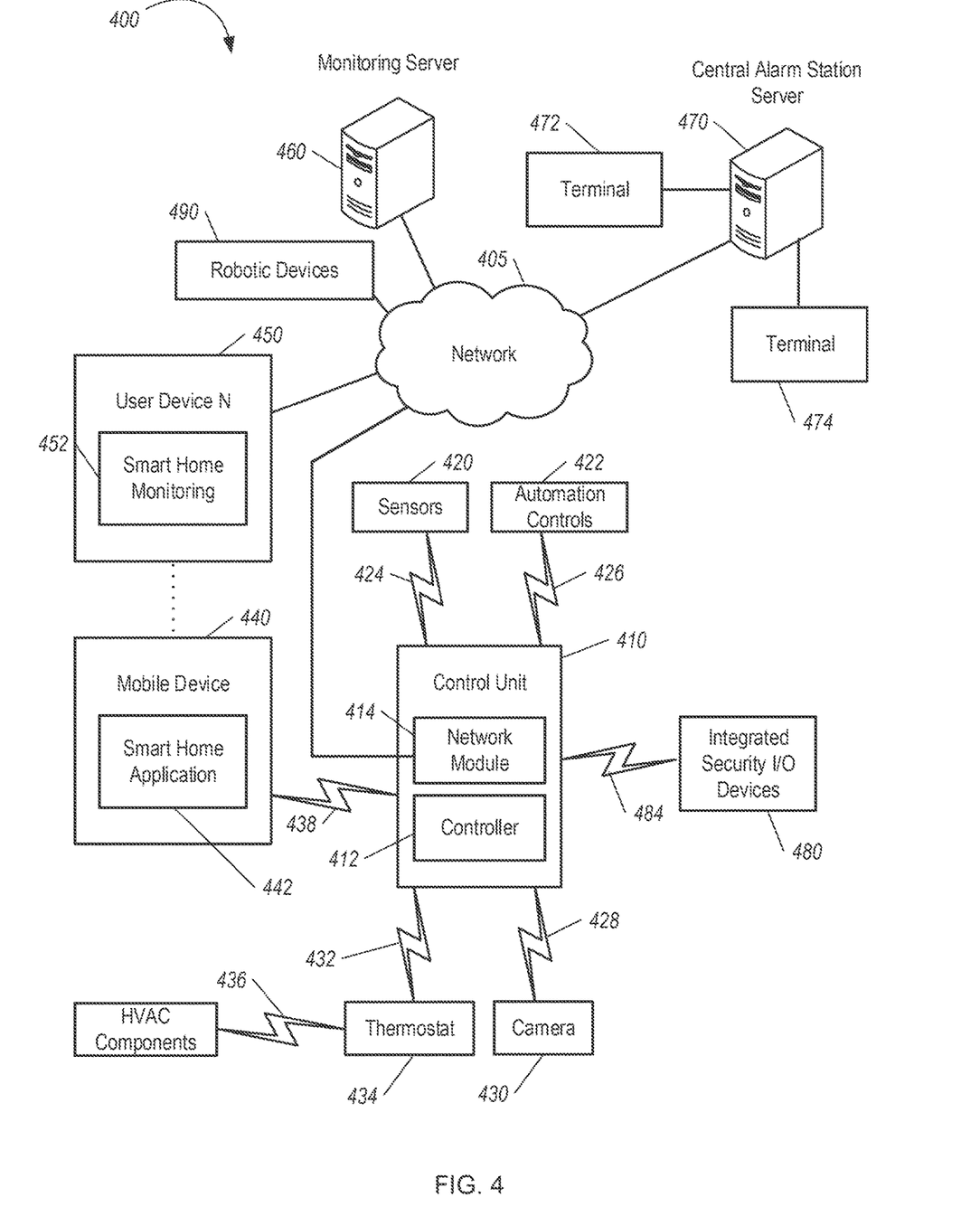
FIG. 4 is a diagram illustrating an example of a home monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a doorbell camera, lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 436, 438, and 484. The communication links 424, 426, 428, 432, 436, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 436, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., a user). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A system comprising one or more computers and one or more storage devices on which are stored instructions that are operable, when executed by the one or more computers, to cause performance of operations comprising:
- detecting an object depicted in a first image frame captured by a camera with detection confidence indicated by a confidence score;
- determining a predicted physical distance between the object and the camera;
- selecting, using the predicted physical distance between the object and the camera and from a plurality of predetermined confidence thresholds each of which (i) are a threshold for a different range of physical distances in a plurality of ranges and (ii) define a different range of confidence scores to be satisfied for an object to be classified as an object of interest, a confidence threshold corresponding to a range of physical distances that includes the predicted physical distance;
- determining, using the confidence threshold selected using the predicted physical distance and the confidence score, that the object is not likely an object of interest; and
- in response to determining that the object is not likely an object of interest using the confidence threshold selected using the predicted physical distance:
  - determining to skip detection for an object in one or more image frames subsequent to the first image frame; and
  - analyzing, for detection of an object of interest, a second image frame captured subsequent to the one or more image frames for depiction of a second object.

2. The system of claim 1, the operations comprising:
in response to determining that the second object is likely an object of interest, tracking the second object.

3. The system of claim 1, wherein determining, using the selected confidence threshold and the confidence score, that the object is not likely an object of interest comprises:
- comparing the selected confidence threshold and the confidence score to determine whether the confidence score satisfies the selected confidence threshold; and
- determining that the confidence score satisfies the selected confidence threshold.

4. The system of claim 3, the operations comprising:
- providing, to a machine learning model trained to detect objects of interest, image data for the object; and
- receiving, from the machine learning model, the confidence score that indicates the object is not likely an object of interest.

5. The system of claim 1, wherein determining the predicted physical distance between the object and the camera comprises determining, using a height of a bounding box that surrounds a depiction of the object in the first image frame, the predicted physical distance between the object and the camera.

6. The system of claim 5, wherein determining, using the height of the bounding box that surrounds the depiction of the object in the first image frame, the predicted physical distance between the object and the camera comprises:
- determining, for each of two or more images captured by the camera, a height of a bounding box that surrounds the depiction of the object in the first image frame; and
- determining, using the two or more heights of the bounding boxes that surround the depiction of the object in the two or more image frames, the predicted physical distance between the object and the camera.

7. The system of claim 5, wherein determining, using the height of the bounding box that surrounds the depiction of the object in the first image frame, the predicted physical distance between the object and the camera comprises determining the predicted physical distance between the object and the camera using the height of the bounding box that surrounds the depiction of the object in the first image frame and camera calibration data that indicates, for each bounding box height range in a plurality of height ranges, a corresponding physical distance.

8. The system of claim 1, wherein determining the predicted physical distance between the object and the camera comprises determining, using a predicted location of a bottom of the object in the first image frame, the predicted physical distance between the object and the camera.

9. The system of claim 8, wherein determining, using the predicted location of the bottom of the object in the first image frame, the predicted physical distance between the object and the camera comprises:
- determining, for each of two or more images captured by the camera, a predicted location of the bottom of the object in the first image frame; and
- determining, using the two or more predicted locations of the bottom of the object in the two or more images, the predicted physical distance between the object and the camera.

10. The system of claim 8, wherein determining, using the predicted location of the bottom of the object in the first image frame, the predicted physical distance between the object and the camera comprises:
- determining, using the predicted location of the bottom of the object in the first image frame and a height of a bounding box that surrounds a depiction of the object in the first image frame, the predicted physical distance between the object and the camera.

11. The system of claim 1, wherein the operations comprise:
- determining a physical distance between the second object and the camera, wherein determining the predicted physical distance between the second object and the camera comprises determining, for a proper subset of images in a sequence of images, the predicted physical distance between the second object and the camera; and
- determining that the second object is likely an object of interest, comprising determining to track the object in each image in the sequence of images.

12. The system of claim 11, wherein:
- the sequence of images comprises five sequential images captured by the camera;
- determining, for the proper subset of images in the sequence of images, the predicted physical distance between the second object and the camera comprises determining, for only a first image in the five sequential images, the predicted physical distance between the second object and the camera; and
- determining that the second object is likely an object of interest and to track the second object in each image in the sequence of images comprises determining that the second object is likely an object of interest and to track the second object in each image in the five sequential images.

13. The system of claim 1, the operations comprising:
- determining a second physical distance between the second object and the camera;
- selecting, from the plurality of predetermined confidence thresholds, a second confidence threshold for the second physical distance; and determining, using the second confidence threshold, that the second object is likely an object of interest and to track the second object.

14. The system of claim 1, the operations comprising:
generating a notification about the object when the confidence score satisfies a notification threshold; and
providing, to a device, the notification about the object.

15. The system of claim 1, wherein determining that the object is not likely an object of interest comprises determining, using the confidence threshold and the confidence score that indicates the object is likely a person, that the object is not likely a person and to skip tracking the object.

16. A non-transitory computer storage medium encoded with instructions that, when executed by one or more computers, cause the one or more computers to perform operations comprising:
detecting an object depicted in a first image frame captured by a camera with detection confidence indicated by a confidence score;
determining a predicted physical distance between the object and the camera;
selecting, using the predicted physical distance between the object and the camera and from a plurality of predetermined confidence thresholds each of which (i) are a threshold for a different range of physical distances in a plurality of ranges and (ii) define a different range of confidence scores to be satisfied for an object to be classified as an object of interest, a confidence threshold corresponding to a range of physical distances that includes the predicted physical distance;
determining, using the confidence threshold selected using the predicted physical distance and the confidence score, that the object is not likely an object of interest; and
in response to determining that the object is not likely an object of interest using the confidence threshold selected using the predicted physical distance:
determining to skip detection for an object in one or more image frames subsequent to the first image frame; and
analyzing, for detection of an object of interest, a second image frame captured subsequent to the one or more image frames for depiction of a second object.

17. The medium of claim 16, wherein determining, using the confidence threshold and the confidence score, that the object is not likely an object of interest comprises:
comparing the confidence threshold and the confidence score to determine whether the confidence score satisfies the confidence threshold; and
determining that the confidence score satisfies the confidence threshold.

18. The medium of claim 17, the operations comprising:
providing, to a machine learning model trained to detect objects of interest, image data for the object; and
receiving, from the machine learning model, the confidence score that indicates the object is not likely an object of interest.

19. A computer-implemented method comprising:
detecting an object depicted in a first image frame captured by a camera with detection confidence indicated by a confidence score;
determining a predicted physical distance between the object and the camera;
selecting, using the predicted physical distance between the object and the camera and from a plurality of predetermined confidence thresholds each of which (i) are a threshold for a different range of physical distances in a plurality of ranges and (ii) define a different range of confidence scores to be satisfied for an object to be classified as an object of interest, a confidence threshold corresponding to a range of physical distances that includes the predicted physical distance;
determining, using the confidence threshold selected using the predicted physical distance and the confidence score, that the object is not likely an object of interest; and
in response to determining that the object is not likely an object of interest using the confidence threshold selected using the predicted physical distance:
determining to skip detection for an object in one or more image frames subsequent to the first image frame; and
analyzing, for detection of an object of interest, a second image frame captured subsequent to the one or more image frames for depiction of a second object.

20. The system of claim 1, wherein selecting the confidence threshold comprises:
selecting a first value for the confidence threshold when the predicted physical distance is greater than a predetermined distance and a second value for the confidence threshold when the predicted physical distance is less than the predetermined distance, wherein the first value is less than the second value.

* * * * *